United States Patent
Keohane et al.

(10) Patent No.: US 7,621,443 B2
(45) Date of Patent: *Nov. 24, 2009

(54) USER CONFIGURABLE ALERTS FOR ATM TRANSACTIONS

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/847,469

(22) Filed: Aug. 30, 2007

(65) Prior Publication Data

US 2008/0052234 A1    Feb. 28, 2008

Related U.S. Application Data

(63) Continuation of application No. 10/970,460, filed on Oct. 21, 2004, now Pat. No. 7,328,839.

(51) Int. Cl.
    G06Q 40/00    (2006.01)
    G07D 11/00    (2006.01)
    G07F 19/00    (2006.01)
(52) U.S. Cl. .................... 235/379; 235/375; 705/43; 902/8
(58) Field of Classification Search ............ 235/379, 235/375, 487; 705/42–44; 902/8
    See application file for complete search history.

(56) References Cited

U.S. PATENT DOCUMENTS

2006/0165060 A1* 7/2006 Dua ..................... 370/352
2007/0250920 A1* 10/2007 Lindsay .................... 726/7

* cited by examiner

*Primary Examiner*—Edwyn Labaze
(74) *Attorney, Agent, or Firm*—Dillon & Yudell LLP

(57) ABSTRACT

A method, system and computer program product for enabling user-customization of an ATM display/receipt for a transaction carried out at an automated teller machine (ATM). The customer/user of the ATM creates/selects specific alerts to be outputted during subsequent ATM transactions. The alerts/notices are linked to the customer account. During subsequent access to the user's account via an ATM, the pre-selected alert/notice is displayed to the user or printed on the transaction receipt.

11 Claims, 5 Drawing Sheets

USER CONFIGURABLE ALERTS FOR ATM TRANSACTIONS

PRIORITY CLAIM

The present application is a continuation of U.S. patent application Ser. No. 10/970,460, titled "User Configurable Alerts For ATM Transactions," filed on Oct. 21, 2004 now U.S. Pat. No. 7,328,839.

BACKGROUND OF THE INVENTION

1. Technical Field

The present invention relates generally to automatic teller machines (ATMs) and specifically to client transactions on ATMs. Still more particularly, the present invention relates to a method and system for enhancing customer transactions at ATMs.

2. Description of the Related Art

Automated teller machines ("ATM") are well known and widely utilized in the banking industry. ATMs are utilized by customers to carry out banking transactions, such as cash dispensing, receipt of deposits, transfer of funds between accounts, and account balance inquiries. The type of banking transactions a customer can carry out are determined by hardware and programming capabilities of the particular ATM as well as the support provided by the banking institution's computer system.

Today, virtually all banking institutions offer customers the ability to conduct a limited number of electronic transactions either from a local ATM located on-site at the institution's branch office, or from a remote ATM of an affiliated institution. When these transactions are completed, ATMs typically provide customers with a printed receipt indicating the particulars of the transactions conducted at the machine.

The information printed on current ATM receipts is very limited. For example, with some ATMs, the customer's receipt may only provide the date of the transaction, the amount of the transaction, and perhaps an ending balance for the corresponding account. Customers today tend to have a bit more savvy and often desire to have more information than is provided by current ATMs. Each customer also has different needs.

With conventional ATMs, customers have to go into the banking institution or access their backing accounts/record online or via an automated phone service. The present invention realizes that each customer is unique and has specific alerts that he/she may desire to receive during completion of an ATM transaction. The present invention also recognizes that it would be desirable to enable a customer to identify/select and receive specific alerts, which the customer wishes to be provided during completion of an ATM transaction. These and other benefits are provided by the invention described herein.

SUMMARY OF THE INVENTION

Disclosed is a method, system and computer program product for enabling user-customization of an alert received from an automated teller machine (ATM) during an ATM transaction. The customer/user of the ATM is able to create/customize specific alerts that the customer wishes to receive when the customer utilizes an ATM. These alerts may be printed on the screen or they may be printed on the transaction receipt.

The user is provided with an avenue for accessing his banking account and selecting from a laundry list of available alerts that are to be outputted following an ATM transaction. Access to the user account may be via a telephone service of via online (Internet) connection. The telephone access may be automated or assisted. Irrespective of the method of access, the customer is provided with the list from which the customer selects alerts for output during ATM transactions. The banking institution links the selected alerts to the customer's ATM account (i.e., database of customer accounts maintained by the banking institution).

In one implementation, the user is able to adjust the selection of whether an alert is printed on a transaction receipt. Since the banking institution maintains specific proprietary ATMs, the institution may program the alert feature into those ATMs and ATMs of partner institutions that share this functionality.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and computer program product that enables user-customization of an alert received by a user during a transaction at an automated teller machine (ATM). The customer/user of the ATM creates specific alerts that the customer wishes to receive when the customer utilizes an ATM. These alerts are then provided to the customer when the customer later utilizes an ATM.

Figure 1A:
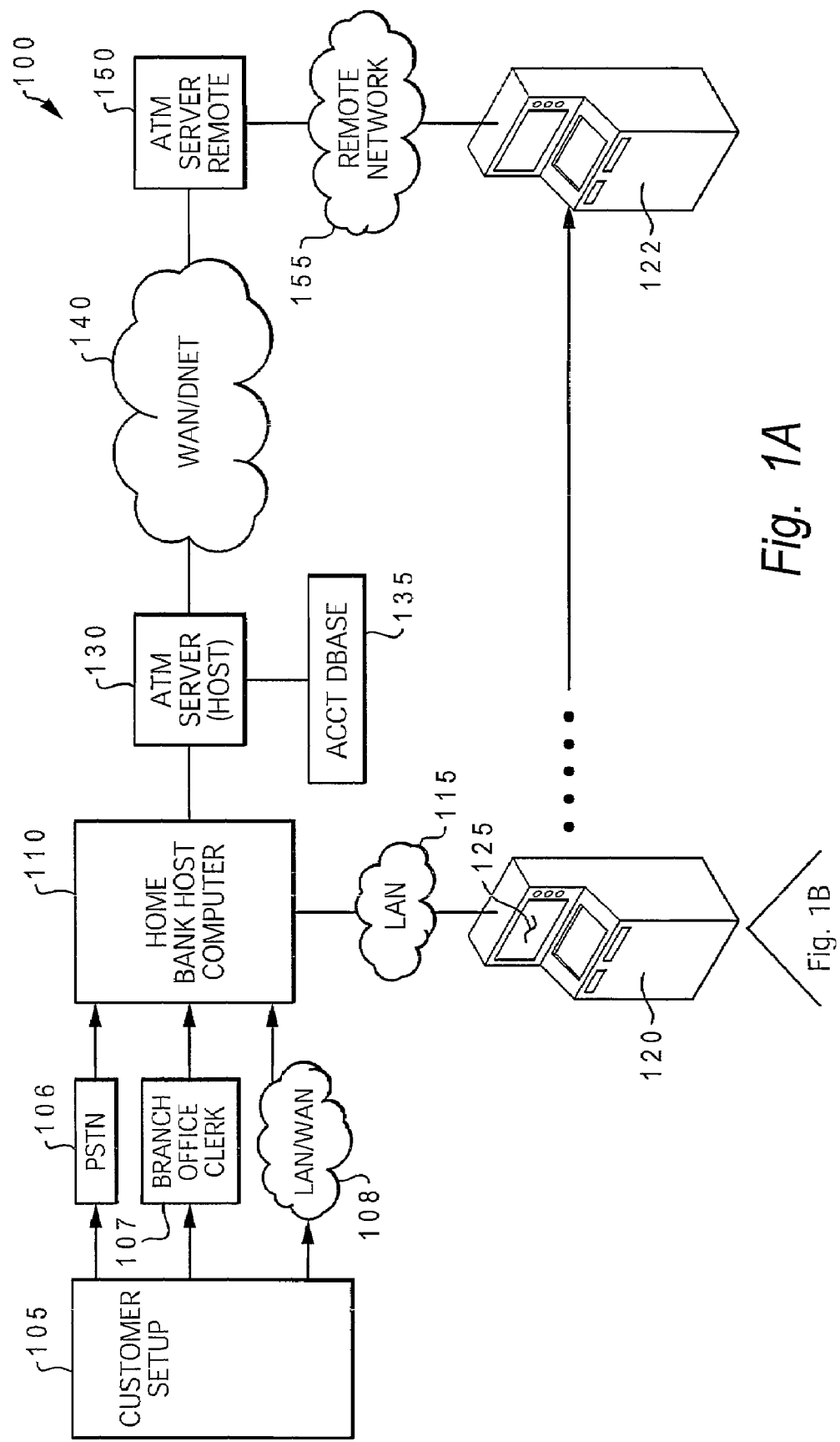
FIG. 1A is a schematic view of an ATM (automated teller machine) network, within which the features of the invention may advantageously be implemented.

Referring now to the drawings and particularly to FIG. 1A, there is illustrated a schematic of ATM network 100. ATM network 100 includes background/supporting network to which is connected a plurality of ATMs, of which exemplary local ATM 120 and remote ATM 122 are illustrated. Local ATM 120 is connected to a computer system 110 of a home bank (referred to hereinafter as home bank computer system (HBCS) 110).

Home bank computer system 110 is the computer system that is operated by the bank or other institution which has primary responsibility for the ATMs 120. Home bank computer system 110 is connected to one or more of local ATMs 120 through wide area network (WAN)/intranet 115. In the illustrative embodiment, local ATM 120 is connected to HBCS 110 via a local area network (LAN) 115. However, it is understood that the ATM may be connected to HBCS via a direct connection. Intranet/WAN 115 is preferably a local or proprietary network that provides communication between the computer system 110 and the ATMs 120 using messages in a transmission format, such as the transmission control protocol/internet protocol ("TCP/IP") format. The messages sent through intranet 115 may be sent in an encrypted or unencrypted form depending on the nature of the system and the security needs of the home bank or ATM 120.

HBCS 110 is illustrated connected to an ATM server 130, which has an associated customer account database 135. Account database 135 may be the central account database for all customer data (i.e., not just ATM related data) while ATM server 130 may be a central server of the bank that also supports the ATM capabilities and transactions in addition to normal banking transactions and general customer account profiles. Alternatively, account database 135 may be a specialized database at which ATM-specific information for each customer's ATM capabilities and transactions are stored.

According to the illustrative embodiment, ATM server 130 is connected to a wide area network 140 (or data network (DNET)). In some embodiments of the invention the wide area network 140 is the Internet, while in other embodiments, other types of WANs/DNETs may be utilized. WAN 140 may communicate data/messages via TCP/IP between numerous computer systems (and/or servers) connected to the wide area network. From the perspective of a home bank, ATM server 130 and HBCS 110 represent local systems in the ATM network. However, by utilization of WAN 140, local systems may be expanded to connect to remote systems that include ATM remote server 150. Remote server 150 may be of another banking/financial institution that provides ATM services in a location or at ATM machines that are not owned/operated/controlled by the home bank. Thus, remote server 150 supports a remote ATM network 155 to which remote ATM 122 is connected.

ATM 120 is an intelligent computer-based machine that is connected to a banking/finance institution that supports customer access to funds and other financial/banking information, as described below. A key feature of the invention is the ability of a customer/ATM user to configure his account to provide specific alerts during ATM transactions.

As illustrated by FIG. 1A, customer access to the customer's account is provided in one of several different methods. Thus, customer setup 105 is completed via customer interfacing with the banking system home computer 110 utilizing a telephone connection, a branch office clerk and/or an online network connection. Telephone connection occurs via a telephone interface set up through a public switch telephone network (PSTN) 106, by which the customer is able to call into a special automated line (e.g., 1-800 banking number) and follow voice prompts to set up specific alerts during ATM transactions. The telephone access may be automated or assisted. Alternatively, the customer simply goes into a branch office at which branch office personnel, such as branch clerk 107 directly enters the requested customer alerts into the bank's computing system. Finally, the customer may utilize a computer to connect online to HBCS 110 via a LAN/WAN 108 and set up and select the ATM alerts. This later method is further described below and illustrated by other figures presented herewith.

Notably, in one embodiment, the customer is provided with selectable alerts at ATM 120 eliminating the need for the user to access his/her account via online or telephone connection. Restrictions on this method may be provided for security reasons. These restrictions may include enabling ATM selections at only ATMs physically located in or at a branch office of the bank at which the user's account exists. Irrespective of the method of selection, later completion of an ATM transaction by the customer automatically triggers the selected alerts to be displayed on the ATM screen, printed on the ATM receipt, or audibly relayed to the customer.

Figure 1B:
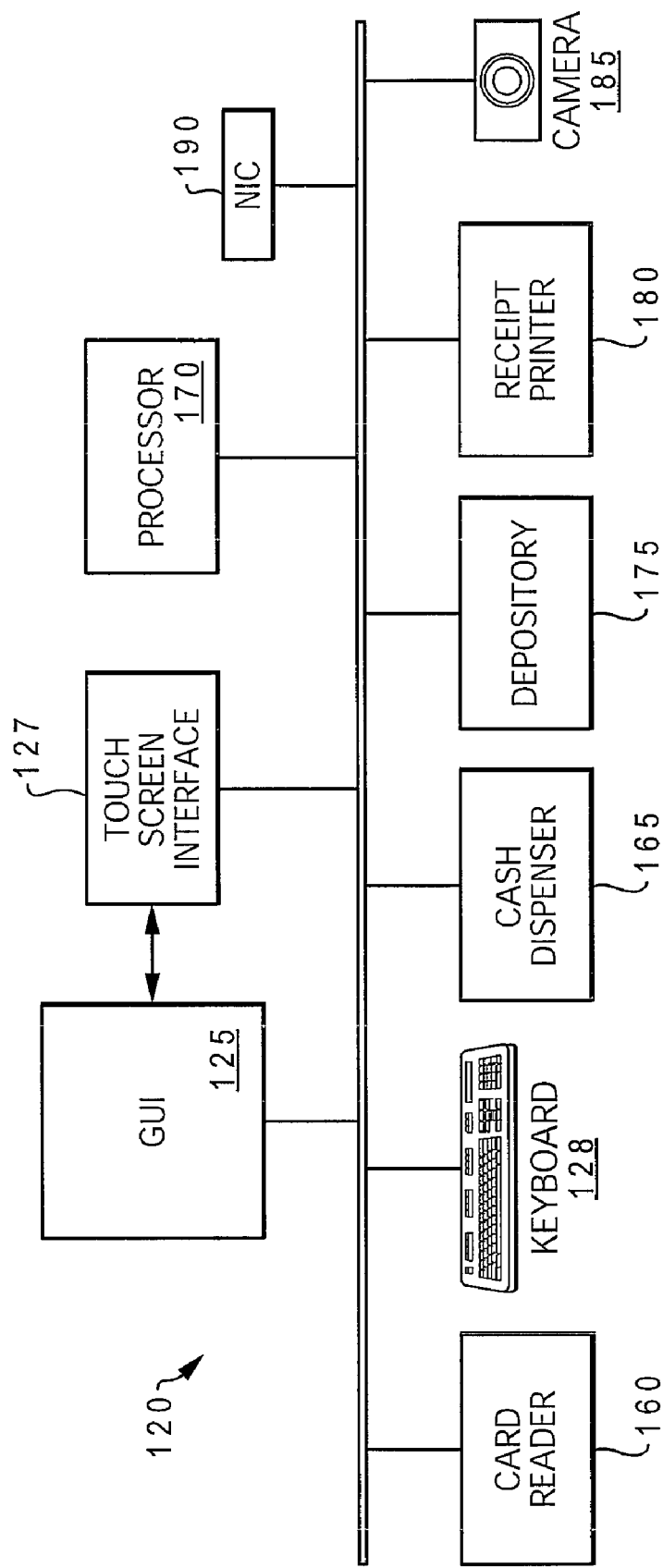
FIG. 1B is a block diagram representing an exemplary embodiment of an ATM with which the added display/print of pre-selected customer alerts may be provided.

FIG. 1B illustrates interconnected components that make up the local ATMs 120 illustrated within FIG. 1A. Notably, remote ATM 122 may be similarly configured to local ATM 120, but not necessarily so. ATMs produced by different manufacturers may differ in key placement and number of keys, key legends, screen size, etc. However, given the trend towards standardization of these features to increase user comfort with using "remote" ATMs, the description herein assumes that the ATMs have similar hardware and software components and exhibit similar functionality. Description of ATM 120 is thus generally applicable to each ATM illustrated, unless a specific reference to remote ATM 122 is made.

With specific reference to FIG. 1B, there is displayed a schematic view of components of ATM 120 utilized in connection with one exemplary embodiment. ATM 120 includes a graphical user interface (GUI) 125, a card reader 160, a keypad 128, cash dispenser (with dispenser slot) 165, depository device (with deposit slot) 175. Additionally, ATM 120 includes a processor 170, receipt printer 180, a security camera 185, and network interface device 190. Each of the devices is operatively connected to an internal control bus 195 by which the intercommunications among the various devices are completed.

In the illustrative embodiment, GUI 125 includes a touch screen 127 (as well as a display screen), which serves as an input/output (I/O) device for communicating with a user of the machine. As an input device, touch screen 127 receives input from the user while the user is interacting with the ATM. Alternate embodiments may include other types and/or additional I/O devices, such as audio speakers. In other embodiments also, fewer or more functional devices may be utilized. It should be further understood that while the described embodiment is of an ATM, the principles may be employed in other types of customer-accessible transaction machines that may not necessarily carry out banking transactions (e.g., ticket issuing machines for an electronic vendor).

For functional operation, ATM 120 includes several software programs that are executable therein, including software for displaying the various screens by which information is visually relayed to the user and software for connecting to a host computer system to initiate security checks (e.g., request for a pin number) when the user enters his ATM card into the card reader slot. Other software code is provided for a host of other functions including managing security and printing receipts following termination of a user transaction. Those skilled in the art understand that the invention necessarily includes a fully functioning ATM with at least the basic ATM features described herein.

As described above, ATM 120 may be physically co-located with the ATM's banking institution (HBCS 110), or may be remotely located with respect thereto. In operation, ATM 120 serves as an interface between a user (banking customer) and the ATM network to receive input from the user and to provide necessary output (and funds, when necessary) to the user. ATM 120 receives appropriate associated PIN information and transaction information from the user. This information is passed to the HBCS 110 for verification and processing, respectively.

For transactions at remote ATM 122, the associated/background computer system identifies the home bank from the information retrieved from the user's ATM card, and passes the necessary transaction information entered by the user to the appropriate HBCS 110 (several may be connected via WAN 140). HBCS 110 verifies the user's account data and then forwards an authorization message (either a deny transaction message or proceed with transaction message, for example) to the remote ATM 122. Based on the authorization received, the remote ATM 122 provides customized alerts and funds, if requested, to the user.

Figure 2:
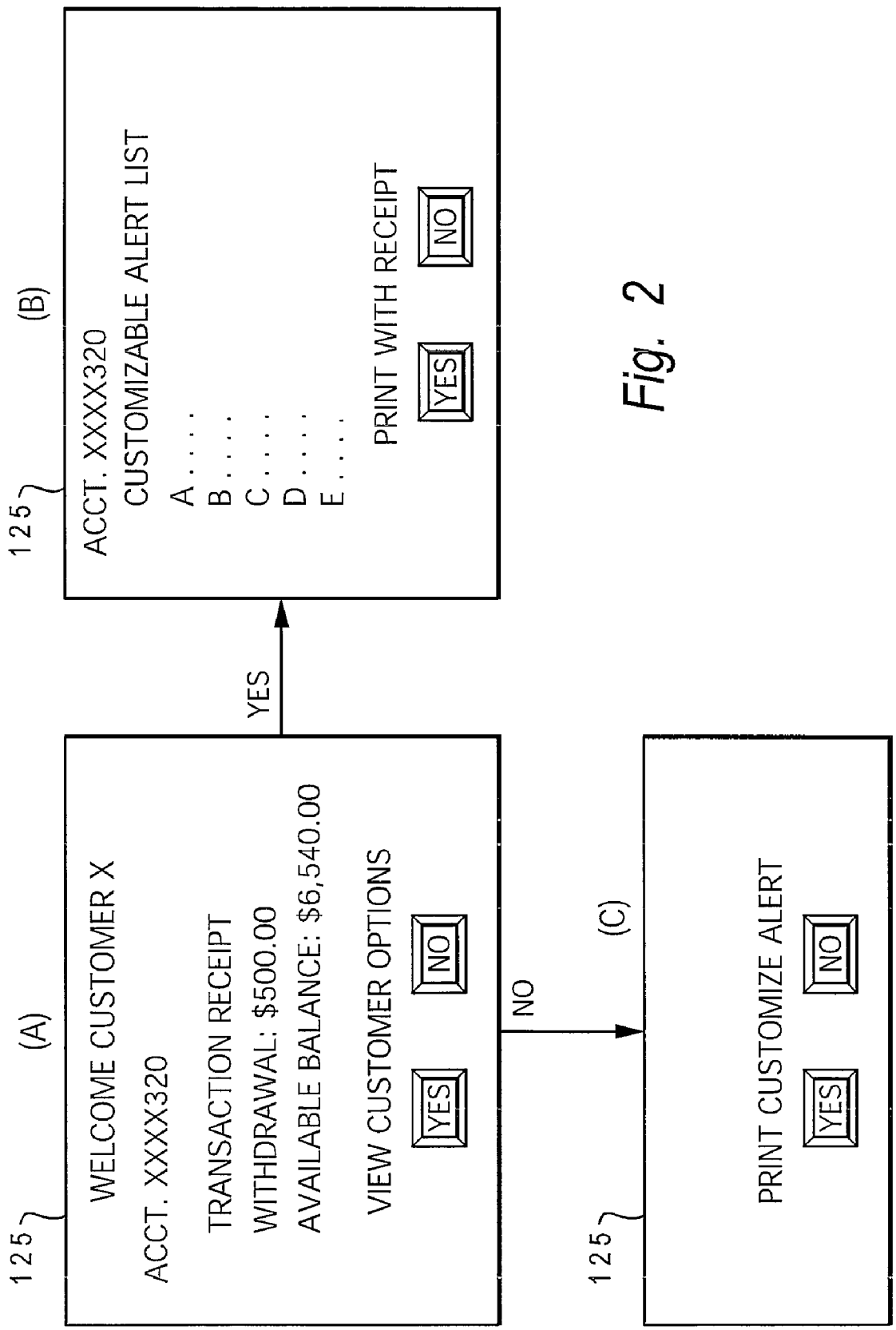
FIGS. 2A-2C are block diagrams of the display scenes of an interface of the ATM of FIG. 2 according to exemplary embodiments of the present invention.

Turning now to FIG. 2, there is illustrated a flow chart of the process by which a user customizes his account for ATM-specific alerts, according to one embodiment of the invention. The flow chart is better understood by reference to FIG. 3, which illustrates a GUI (web browser) of an online customer account at the home bank computer system 110.

As described above, customers are provided with several avenues for accessing their account and a laundry list of available ATM-specific alerts from which the customer selects alerts to receive during an ATM transaction. The exemplary embodiment provided herein describes the online method. However, the features described are applicable irrespective of the method of accessing and customizing the alerts linked to customer's account. Notably also, while the invention is described with specific reference to alerts delivered during an ATM transaction, the invention may be implemented with a different user interface than the ATM. Thus, the interface within which the alert is provided may be a web interface or interface accessed via phone or downloaded to a phone. With these alternate embodiments, the alerts may be provided independently of a user accessing an ATM machine.

The flow chart of FIG. 2 begins at block 202 with the customer accessing his/her account at the URL (universal resource locator) of the banking institution's computer/server. The customer is provided, at block 203, with the list of customer selectable alerts for print, audible output, and/or display during ATM transactions.

Figure 3:
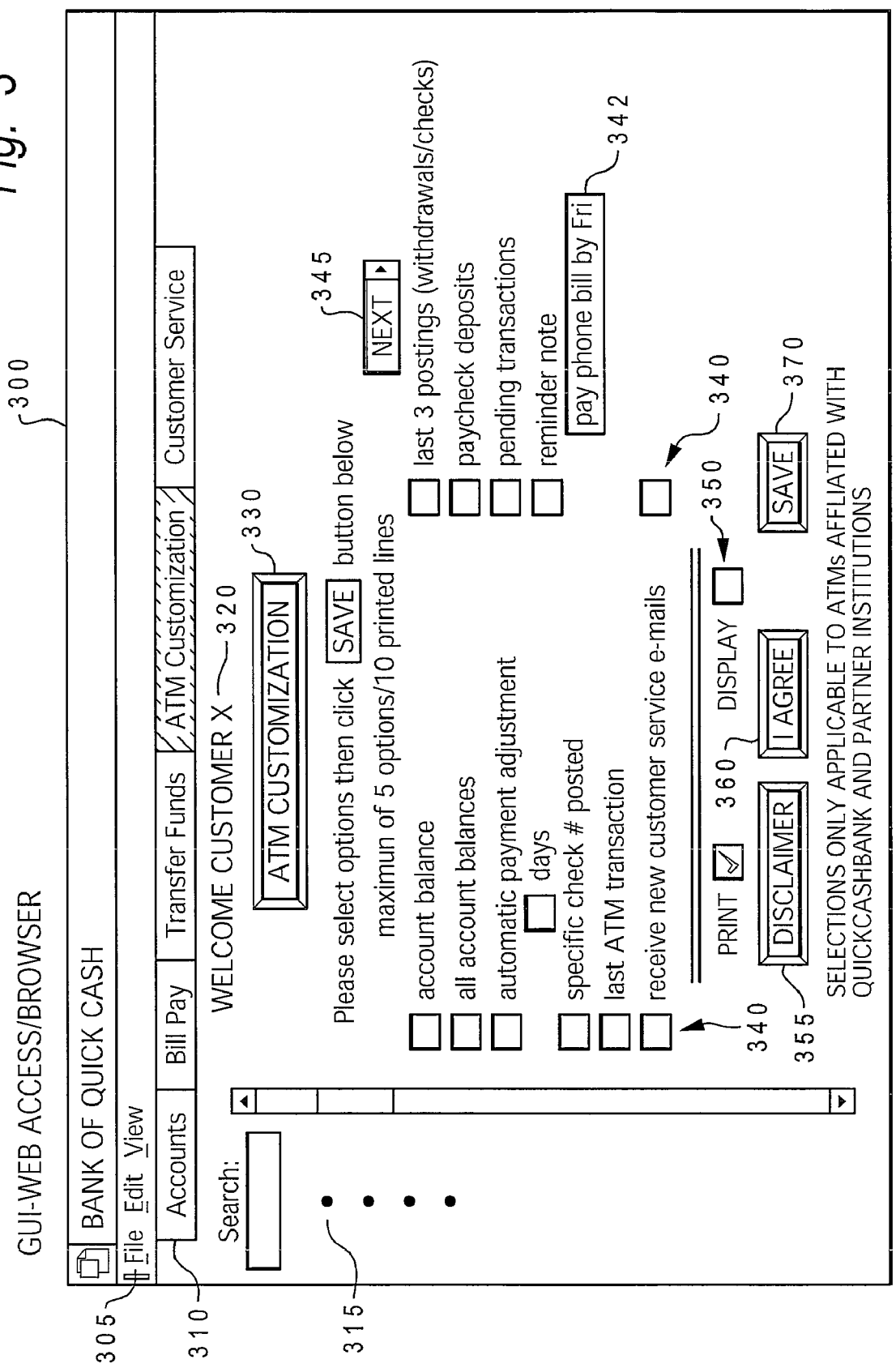
FIG. 3 illustrates an exemplary user interface for online selection of ATM display/print options by a customer in accordance with one embodiment of the present invention.

An exemplary embodiment of a user interface (preferably a browser GUI) by which the customer selects his desired ATM alerts via online access to the customer's account profile is provided by FIG. 3. GUI 300 includes several of the standards browser-styled items, e.g., top-level menu items 305 and search items 315. Additionally, GUI 300 includes bank identification 302, customer identification 320 and selections bar 310 of available bank features.

Illustrated by shaded block within selections bar 310 is ATM alert-customization feature 312. When selected by the customer, an associated ATM customization window 330 opens within GUI 300. As illustrated, ATM customization window 330 includes a list of user selectable alerts 340 each selected by the user placing a check within a selection box adjacent to the selectable alert. Specific ones of selectable alerts include (1) withdrawals over a specific amount, (2) scheduled automatic payment adjustment, (3) customer service emails, (4) pending transactions, (5) specific check numbers cashed and (6) reminder notes.

"Scheduled automatic payments" enables the user to be alerted of amounts of money that are to be automatically withdrawn from the account within a predefined period of days following the transaction (e.g., 3 days). This feature may be time-limited, e.g., payments scheduled within 3 days of the withdrawal. Thus, as illustrated, a specific time period may be entered into a day counter 343 by the customer when the option for receipt of an alert for an automatic payment adjustment is selected/checked. This provides the user with a more accurate picture of his/her available balance. In practical implementation, this feature prevents a user from withdrawing more funds than he has available to cover pending payments, and prevents an overdraft on the account.

"Customer service emails" enables HBCS-transmitted emails to be displayed to a customer who is expecting email communication from a bank representative. For example, during disputes regarding a posted transaction, customer service personnel occasionally provides online customers with an email response, and this feature of the invention enables an alert that an email has been received from the HBCS 110 to be given to the customer during the ATM transaction. "Pending transactions" share similarities with the scheduled automatic payments. A deposit/withdrawal by a co-user of the account or posting of a check may still be pending and not reflected on the current balance shown to the user. Finally, "reminder alerts" represents actual alerts the user types into an alert entry box 342 to display/print out when the user next goes to the ATM. An example is a reminder to pay a bill when the user knows that he/she will need additional cash for that payment during a next trip to the ATM.

Below the list of selectable alerts, are several output options 350 by which the user indicates whether the selected alerts are to be printed or displayed and/or audibly relayed. An alternative embodiment enables a first (confidential) alert to be linked by the customer for printing while a second (un-confidential) alert is linked for display or audible output. The alert may also be outputted in a combination of the available output methods, including printed, and display, and/or audible alert.

ATM customization window 330 includes several navigation buttons, including "next" button 345 to display/scroll additional available options, "save" button 370 to store the selections made by the customer, and "agree" button 360 by which the customer indicates agreement with the disclaimer presented within disclaimer bar 355.

Additionally, several notices are shown within ATM customization window 330. A first notice at the base of the screen explains a limitation on the possible customer selections. In this exemplary embodiment, the options are available only at ATMs of the banking institution of affiliated/partner banks. A second notice at the top of the screen, informs the customer that the customer may select up to five of the displayed alerts.

The limit on the number of available alerts is imposed in this exemplary embodiment to prevent a user selecting to receive too many alerts during an ATM transaction, which restriction may be imposed due to available bandwidth and/or other practical reasons. For example, the display screen of the ATM has a limited display area and the receipt rolls are also limited in size (with conventional ATMs). Requesting too many alerts would lead to a cumbersome ATM interaction and would prove costly if each customer desired to print entire laundry lists of alerts on the limited rolls of receipt paper each machine can hold. Other security related or practical reasons may limit the amount or type of alerts that a user may select from customization window 330.

Returning to the process flow of FIG. 2, at block 204, the customer selects his/her desired ATM customization alerts. Notably, in one implementation, this selection may also include selecting whether the alert format is for display only, print only, audible relay only, or some combination of the two or three forms of output. The server of the banking institution updates the customer's ATM customization alerts at block 206 and then stores the updates in the customer account (at the database of customer accounts maintained by the banking institution) at block 208.

Figure 4:
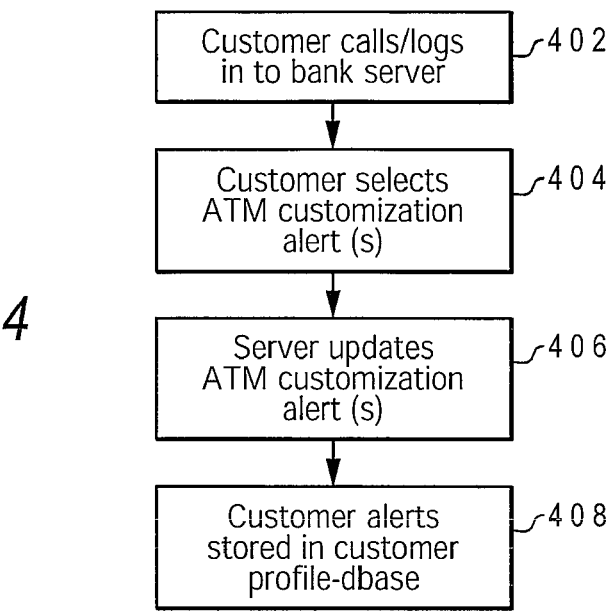
FIG. 4 is a flow chart illustrating the process of customer-selection of display/print alerts utilizing the user interface of FIG. 3 in accordance with one implementation of the invention.
Figure 5:
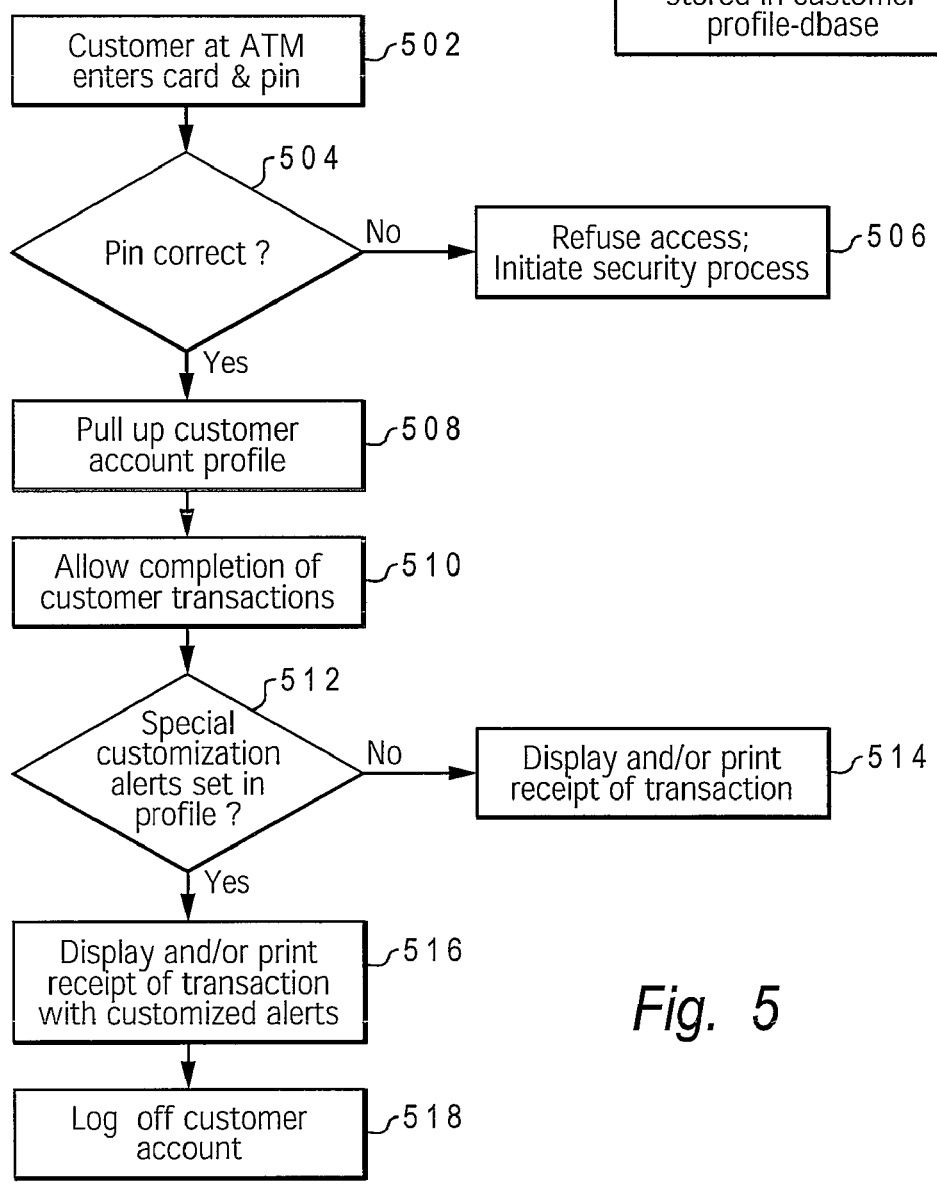
FIG. 5 is a flow chart illustrating user transactions at the ATM and automated display/print of supplemental, customer-desired alerts in accordance with one embodiment of the invention.

Turning now to the flow chart of FIG. 5 and illustrated GUIs of FIGS. 4A-4C, actual ATM transactions and output of pre-selected customization alerts are illustrated. The process begins at block 502 at which the customer enters his card and pin at the ATM. A determination is made at block 504 whether the entered pin is correct, and if not, the user is refused access to the customer account and a security process is initiated as shown at block 506.

Once a correct pin is entered, however, the customer account profile is retrieved at block 508, and access to the customer account linked to the card is provided to complete the user transactions, as indicted at block 510. The software of the ATM displays the information transmitted to it on the display monitor of the ATM. The HBCS checks the customer account at block 512 to determine whether special customization alerts have been pre-selected by the customer. When no alerts have been selected, the standard ATM display is provided and a receipt with the standard information is printed at completion of the transaction, as shown at block 514.

However, when the customer has pre-selected to receive one or more alerts, the standard ATM display and/or receipt are enhanced with the alerts selected by the customer for display and/or printing, as shown at block 516. The alerts may be displayed only after the transaction is completed, or if print-only option was selected by the customer, the alert is not displayed but printed on the receipt generated for the transaction. The user then logs off the customer account and removes the ATM card as shown at block 518.

In one implementation, the user is provided the option of selecting which alerts to print when the ATM cash transaction is completed. The user may then decide whether to print the alert on the transaction receipt. Since the banking institution maintains specific proprietary ATMs, the institution may program this feature into their ATMs and ATMs of other institutions that share the user-customized display and/or receipt printing functionality.

With the above features of the invention, a user of an ATM is able to create specific ATM alerts for actions that the user wished to be aware of or other alerts the user wishes to receive during subsequent visits to an ATM. FIGS. 4A-4B illustrates exemplary screens displayed to the user at the ATM. Screen 125 of FIG. 4A is an ATM screen displaying a summary of the current transaction and account balance. Below this information is the prompt for the user to view customized alerts. In one implementation, this prompt is triggered to appear only when there are customized alerts pre-selected by the user. When the user selects no, the GUI screen changes to the print screen (FIG. 4C) at which the user is then prompted whether he wishes to also print the customized alerts. This screen is valuable for situations in which the user does not wish the alert provided on the screen to be viewed by the built-in camera or someone standing immediately behind him/her, who may have a view (or partial view) of the screen.

When the user selects yes from the main screen (FIG. 4A), the screen of FIG. 4B is displayed with the list of customized alerts. From this screen, the user is prompted whether to print the customized alerts with the receipt of the transaction. This enables the user to complete the transaction, then view the customizable alerts without having to print these alerts on the transaction receipt. When the alert is a reminder note, for example, it may be sufficient for the user to receive the reminder without having the reminder printed on his transaction receipt.

As explained above, one implementation of this feature allows a check of the primary account for scheduled direct/electronic payments (e.g., through bill pay service) on the customer's account. That is, in addition to the current balance, the customer also receives an alert with the total or list of automatic payments schedule to be taken from the account so the customer knows the "real" balance of disposable funds in his/her account. Other information that may be provided via the alerts includes: single withdrawals over a specific amount; electronic deposits; paycheck deposits; specific check numbers cached; deposit at an ATM of personal checks; etc.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention. For example, while the invention is described with specific reference to alerts delivered during an ATM transaction, the invention may be implemented with a different user interface than the ATM. Thus, the interface within which the alert is provided may be a web interface or interface accessed via phone or downloaded to a phone. Irrespective of the interface selected, the alerts can be provided independently of the user accessing an ATM machine.

What is claimed is:

1. In a first computer device, a method comprising:
linking an alert to an occurrence of a specific activity within a customer account, which account is accessible via a network-connected device, wherein said alert has one or more characteristics associated therewith, including whether the alert is confidential or non-confidential, wherein said linking further comprises:
displaying a user interface that includes one or more alerts and one or more activities that may be linked to the one or more alerts;
receiving, via the user interface, a selection of one or more different alerts to link to one or more activities that may occur within the customer account, wherein each alert identifies one or more of the activities, wherein when multiple different activities are associated with one or more alerts, the one or more alerts are forwarded to the network-connected device to signal the occurrence of the multiple different activities; and
storing the selected one or more alerts along with information identifying the one or more activities to which the alert is linked, wherein said storing associates the alert and information with the customer account;
monitoring for the activity within said customer account that is related to the alert selected by the customer; and
in response to the occurrence of the activity, automatically forwarding the alert for outputting at the network-connected device during a subsequent access of said customer account via the network-connected device, wherein the alert is forwarded for outputting utilizing an output mechanism of the network-connected device to signal the occurrence of the activity within said customer account, wherein an outputting of the alert at the ATM is affected by a confidentiality characteristic associated with the alert.

2. The method of claim 1, wherein:

the network-connected device is an automatic teller machine (ATM) that is coupled to the first computer device via a network and the customer account is accessed at the ATM, which enables completion of an ATM transaction;

said activity to which the alert is linked comprises at least one of: (1) posting of a specific check to the account; (2) scheduled automatic payments; (3) pending transactions; (4) customer service emails, wherein the activity is a receipt of a customer service emails and the alert is one of an email alert and a display of email content transmitted from a main banking system to the ATM and displayed when the customer account is accessed at the ATM; and (5) reminder notes, which provides actual text-based messages received as an input into an alert entry box that is utilized for outputting its contents at the ATM when the customer account is accessed from the ATM; and said outputting outputs said alert in addition to ATM transaction information, wherein only standard transaction information is provided when either (a) no alert has been pre-selected by the customer or (b) no activity associated with the alert has occurred.

3. The method of claim 1, wherein the activity is one of "scheduled automatic payments" and "pending transactions" that have not yet posted to the customer account, and wherein the alert informs the user at the ATM of the amount and dates of the scheduled automatic payments or pending transactions, scheduled to occur on the customer account within a pre-defined period following a current ATM transaction, and whereby the user is provided a more accurate picture of an available balance within the pre-defined period and possible overdraft on the customer account.

4. A data processing system comprising:

a processor;

a data storage facility hosting one or more customer account information;

network connection means for allowing remote access via an external device to said one or more customer account information at the data storage facility; and program logic for:

linking an alert to an occurrence of a specific activity within a customer account that is accessible via an automatic teller machine (ATM), wherein said alert has one or more characteristics associated therewith, including whether the alert is confidential or non-confidential, wherein said linking logic further comprises logic for:

displaying a user interface with one or more of said alerts as a selectable option along with one or more activities;

receiving, via the user interface, a selection of one or more different alerts to link to one or more activities that may occur within the customer account, wherein each alert identifies one or more of the activities, wherein when multiple different activities are associated with one or more alerts, the one or more alerts are forwarded to the ATM to signal the occurrence of the multiple different activities; and storing each selected one of said one or more alerts along with information identifying the one or more activities to which the alert is linked, wherein said storing associates the alert and information with the customer account;

monitoring for the activity within said customer account that is related to the alert selected by the customer; and in response to the occurrence of the activity, automatically forwarding the alert for outputting at the ATM during a subsequent access of said customer account during an ATM transaction, wherein the alert is forwarded for outputting utilizing an output mechanism of the ATM to signal the occurrence of the activity within said customer account, wherein an outputting of the alert at the ATM is affected by a confidentiality characteristic associated with the alert.

5. The data processing system of claim 4, wherein:

said activity to which the alert is linked comprises one or more of: (1) posting of a specific check to the customer's account; (2) scheduled automatic payments; (3) pending transactions; (4) customer service emails, wherein the activity is a receipt of a customer service emails and the alert is one of an email alert and a display of email content transmitted from a main banking system to the ATM and displayed when the customer account is accessed at the ATM; and (5) reminder notes, which provides actual text-based messages received as an input into an alert entry box that is utilized for outputting its contents at the ATM when the customer account is accessed from the ATM; and said outputting outputs said alert in addition to ATM transaction information, wherein only standard transaction information is provided when either (a) no alert has been pre-selected by the customer or (b) no activity associated with the alert has occurred.

6. The data processing system of claim 4, wherein the activity is one of "scheduled automatic payments" and "pending transactions" that have not yet posted to the customer account, and wherein the alert informs the user at the ATM of the amount and dates of the scheduled automatic payments or pending transactions, scheduled to occur on the customer account within a pre-defined period following a current ATM transaction, and whereby the user is provided a more accurate picture of an available balance within the pre-defined period and possible overdraft on the customer account.

7. An ATM network comprising:

a repository of customer accounts maintained by a financial institution;

a plurality of ATMs with access to said repository and which provides a user with authenticated access to a customer account stored on said repository; and at least one financial institution computer for accessing and updating information within the customer account stored on said repository, said computer having a processor and code executing thereon to provide:

means for linking an alert to an occurrence of a specific activity within a customer account, which account is accessible via an automatic teller machine (ATM), wherein said alert has one or more characteristics associated therewith, including whether the alert is confidential or non-confidential, wherein said means for enabling includes:

means for displaying a user interface within which is presented one or more of said alerts as a selectable option along with one or more activities that may be linked to the one or more alerts; and means for receiving, via the user interface, a selection of one or more different alerts to link to one or more activities that may occur within the customer account, wherein each alert identifies one or more of the activities, wherein when multiple different activities are associated with one or more alerts, the one or more alerts are forwarded to the ATM to signal the occurrence of the multiple different activities; and means for storing each selected one of said one or more alerts along with information identifying the one or more activities to which the alert is linked, wherein said storing associates the alert and information with the customer account;

means for monitoring for the activity within said customer account that is related to the alert selected by the customer; and in response to the occurrence of the activity, means for automatically forwarding the alert for outputting at the network-connected device during a subsequent access of said customer account during an ATM transaction, wherein the alert is forwarded for outputting utilizing an output mechanism of the ATM to signal the occurrence of the activity within said customer account, wherein an outputting of the alert at the ATM is affected by a confidentiality characteristic associated with the alert.

8. The ATM network of claim 7, wherein:

said activity to which said alert is linked comprises at least one of: (1) posting of a specific check to the customer's account; (2) scheduled automatic payments; (3) pending transactions; (4) customer service emails, wherein the activity is a receipt of a customer service emails and the alert is one of an email alert and a display of email content transmitted from a main banking system to the ATM and displayed when the customer account is accessed at the ATM; and (5) reminder notes, which provides actual text-based messages received as an input into an alert entry box that is utilized for outputting its contents at the ATM when the customer account is accessed from the ATM; and said outputting outputs said alert in addition to ATM transaction information, wherein only standard transaction information is provided when either (a) no alert has been pre-selected by the customer or (b) no activity associated with the alert has occurred.

9. A computer program product comprising:

a computer readable storage medium; and program instructions on said computer readable storage medium for:

linking an alert to an occurrence of a specific activity within a customer account, which account is accessible via a network-connected device, wherein said alert has one or more characteristics associated therewith, including whether the alert is confidential or non-confidential, wherein said program instructions for linking further comprises instructions for:

displaying a user interface within which is presented one or more of said alerts as a selectable option along with one or more activities that may be linked to the one or more alerts;

receiving, via the user interface, a selection of one or more different alerts to link to one or more activities that may occur within the customer account, wherein each alert identifies one or more of the activities, wherein when multiple different activities are associated with one or more alerts, the one or more alerts are forwarded to the network-connected device to signal the occurrence of the multiple different activities; and storing each selected one of said one or more alerts along with information identifying the one or more activities to which the alerts are linked, wherein said storing associates the alert to the activity within the customer account;

monitoring for the activity within said customer account that is related to the alert selected by the customer; and in response to the occurrence of the activity, automatically forwarding the alert for outputting at the network-connected device during a subsequent access of said customer account via the network-connected device, wherein the alert is forwarded for outputting utilizing an output mechanism of the network-connected device to signal the occurrence of the activity within said customer account, wherein an outputting of the alert at the ATM is affected by a confidentiality characteristic associated with the alert.

10. The computer program product of claim 9, wherein:

the network-connected device is an automatic teller machine (ATM) that is coupled to the first computer device via a network and the customer account is accessed at the ATM, which enables completion of an ATM transaction;

said activity to which the alert is linked comprises at least one of: (1) posting of a specific check to the account; (2) scheduled automatic payments; (3) pending transactions; (4) customer service emails, wherein the activity is a receipt of a customer service emails and the alert is one of an email alert and a display of email content transmitted from a main banking system to the ATM and displayed when the customer account is accessed at the ATM; and (5) reminder notes, which provides actual text-based messages received as an input into an alert entry box that is utilized for outputting its contents at the ATM when the customer account is accessed from the ATM; and said outputting outputs said alert in addition to ATM transaction information, wherein only standard transaction information is provided when either (a) no alert has been pre-selected by the customer or (b) no activity associated with the alert has occurred.

11. The computer program product of claim 9, wherein the activity is one of "scheduled automatic payments" and "pending transactions" that have not yet posted to the customer account, and wherein the alert informs the user at the ATM of the amount and dates of the scheduled automatic payments or pending transactions, scheduled to occur on the customer account within a pre-defined period following a current ATM transaction, and whereby the user is provided a more accurate picture of an available balance within the pre-defined period and possible overdraft on the customer account.

* * * * *